United States Patent [19]
Popat

[11] Patent Number: 5,997,680
[45] Date of Patent: Dec. 7, 1999

[54] METHOD OF PRODUCING PRINTED MEDIA

[75] Inventor: Ghanshyam H. Popat, Alta Loma, Calif.

[73] Assignee: Avery Dennison Corporation, Pasadena, Calif.

[21] Appl. No.: 08/641,332

[22] Filed: Apr. 30, 1996

[51] Int. Cl.[6] .................................................. B32B 31/00
[52] U.S. Cl. .............................. 156/252; 428/43; 428/77; 428/78; 428/79; 428/81; 428/138; 428/192; 428/304.4; 283/105; 156/250; 156/252; 156/268; 156/277
[58] Field of Search ................................. 428/43, 77, 78, 428/79, 81, 131, 138, 192, 411.1, 184, 304.4; 283/105; 156/268, 252, 250, 277; 264/400; 101/129, 419, 415.1

[56] References Cited

U.S. PATENT DOCUMENTS

| | | | |
|---|---|---|---|
| 3,267,780 | 8/1966 | Roth | 83/880 |
| 3,288,006 | 11/1966 | Erlandson | 83/879 |
| 3,338,199 | 8/1967 | Taylor | 413/13 |
| 3,790,744 | 2/1974 | Bowen | 218/121.69 |
| 4,176,572 | 12/1979 | Pennington | 83/262 |
| 4,457,199 | 7/1984 | Corcoran | 83/862 |
| 4,494,435 | 1/1985 | Lindsay | 83/880 |
| 4,524,894 | 6/1985 | Leblond | 225/2 |
| 4,979,612 | 12/1990 | Melbye | 206/216 |
| 5,132,915 | 7/1992 | Goodman | 364/479.03 |
| 5,160,573 | 11/1992 | Takagi et al. | 156/510 |
| 5,220,858 | 6/1993 | Allen et al. | 83/880 |
| 5,238,269 | 8/1993 | Levine | 281/2 |
| 5,398,580 | 3/1995 | Gerjardt et al. | 83/880 |
| 5,571,587 | 11/1996 | Bishop et al. | 428/43 |

FOREIGN PATENT DOCUMENTS

| | | |
|---|---|---|
| O 688 006A1 | of 0000 | European Pat. Off. . |
| 0 377 289 A2 | 12/1989 | European Pat. Off. . |
| 4240825A1 | of 0000 | Germany . |
| WO 88/07737 | 10/1988 | WIPO . |
| WO 94/20944 | 9/1994 | WIPO . |

*Primary Examiner*—Deborah Jones
*Assistant Examiner*—Abraham Bahta
*Attorney, Agent, or Firm*—Oppenheimer Wolff & Donnelly LLP

[57] ABSTRACT

Two pairs of parallel substantial-cut or scored lines extend the length of a card stock sheet and short through-cut lines extend between each of the pairs to define two columns of business card blanks on the sheet. The sheet is passed through a laser or ink jet printer, printing the desired identifying or other indicia on the blanks. The blanks are then separated along the substantial-cut and through-cut lines and the waste sheet portions at the ends, sides, and between the columns are disposed of. The business cards separate cleanly along the substantial-cut lines, superior to the microperforated business card separation lines. Even with the substantial-cut and full-cut lines, the card stock sheets have enough integrity to reliably pass through the printer without breaking apart.

28 Claims, 2 Drawing Sheets

METHOD OF PRODUCING PRINTED MEDIA

BACKGROUND OF THE INVENTION

The present invention relates to methods of forming business cards and to the constructions of sheets of blank business cards for passing through laser or ink jet printers or copiers.

Figure 1:
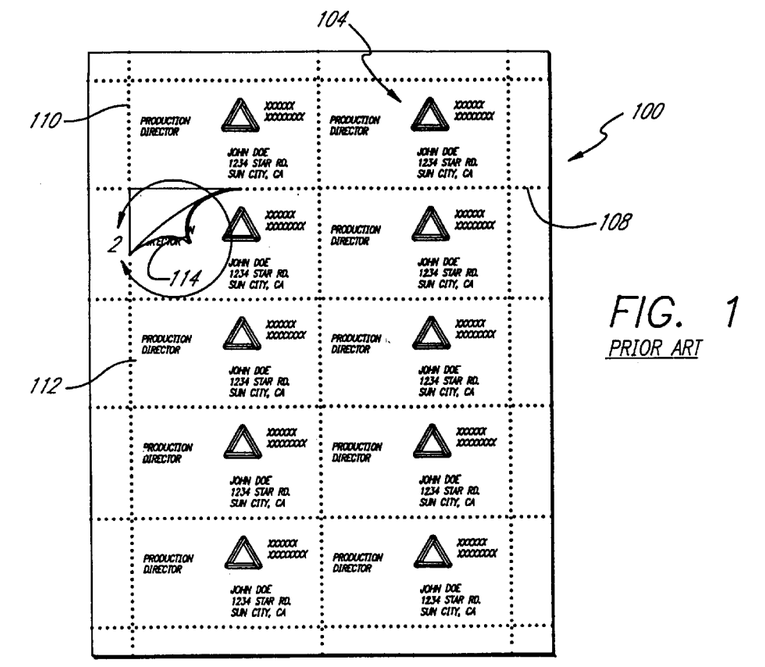
FIG. 1 is a front view of a sheet of business cards of the prior art, after having been printed, and showing one of them being torn away along its microperforation lines.
Figure 2:
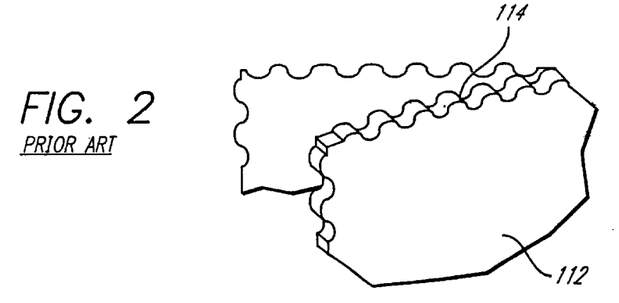
FIG. 2 is an enlarged view taken on circle 2 of FIG. 1.

A sheet of business cards as known in the prior art is shown in FIG. 1 generally at 100. Sheet 100 is a drawing of the sheet after having passed through a laser or ink jet printer and with the desired indicia shown generally at 104 printed thereon. Sheet 100 was formed with a gridwork of horizontal and vertical microperforation lines 108, 110 extending the full length and width of the sheet. The microperforations are typically more than fifty per inch. Although the microperforations are thereby small and close together, when the cards 112, after the printing operation thereon, are separated from one another by tearing along the lines, perfectly clean cuts or edges do not result. Rather, the edges 114 are slightly fuzzy as shown in the enlarged view of FIG. 2. These fuzzy edges 114 give the card 112 a less professional look than clean knife cut edges and in certain uses are unacceptable.

SUMMARY OF THE INVENTION

Directed to remedying the problems of the prior art, disclosed herein is an improved business card sheet assembly. The assembly includes a card stock sheet having two parallel pairs of substantial-cut lines extending the length of the sheet and engaging the sheet at both ends thereof. The substantial-cut lines extend about 90% through the thickness of the sheet from the front towards the back surface. The sheet is then die cut with short (through-cut) lines extending widthwise between the lines of each pair. The substantial-cut and through-cut lines form on the sheet two columns of business card blanks, with paper waste strips at the side (and end) margins and between the columns. The sheet is then passed through a laser or ink jet printer and the desired indicia printed on each of the blanks. The printed card blanks are separated from one another along the substantial-cut and through-cut lines. The borders or edges of the card are clean, superior to the prior art microperforated cards.

Other objects and advantages of the present invention will become more apparent to those persons having ordinary skill in the art to which the present invention pertains from the foregoing description taken in conjunction with the accompanying drawings.

DETAILED DESCRIPTION OF PREFERRED EMBODIMENTS OF THE INVENTION

Referring to FIGS. 3–6 a sheet assembly of the present invention is shown generally at 130. The sheet assembly 130 is shown at the bottom left of FIG. 3 before entering the printer 134 and as it would be purchased by the user (after removal from its packaging (not shown)). The sheet assembly 130' is shown in the upper right of FIG. 3 and (in isolation) in FIG. 4 after having passed through the printer 134, and with the identifying indicia shown generally at 140 printed thereon. As an example, the indicia 140 can include the individual's name 142, address 144, title 146, company name 148 and company logo 150. It can additionally or alternatively include other information such as telephone and facsimile numbers and/or E-mail addresses as desired. The printer 134 can be a laser or ink jet printer, or photocopier.

Figure 3:
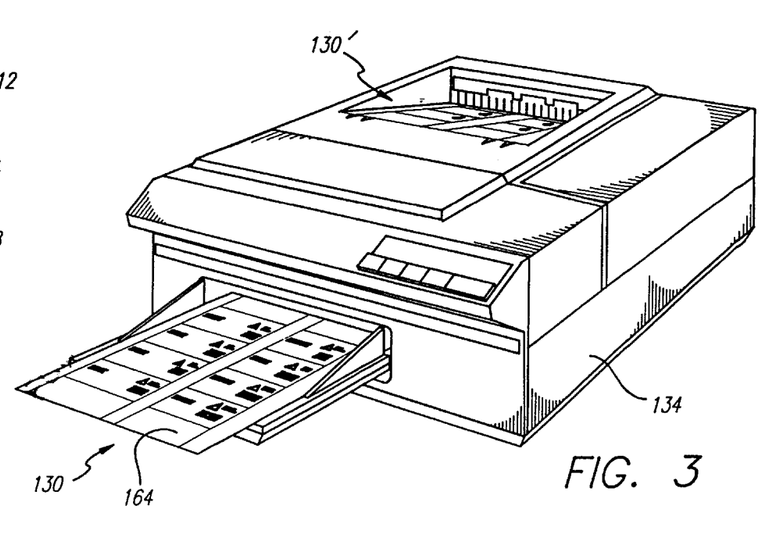
FIG. 3 is a perspective view showing sheet assemblies of the present invention passing through a printer.
Figure 4:
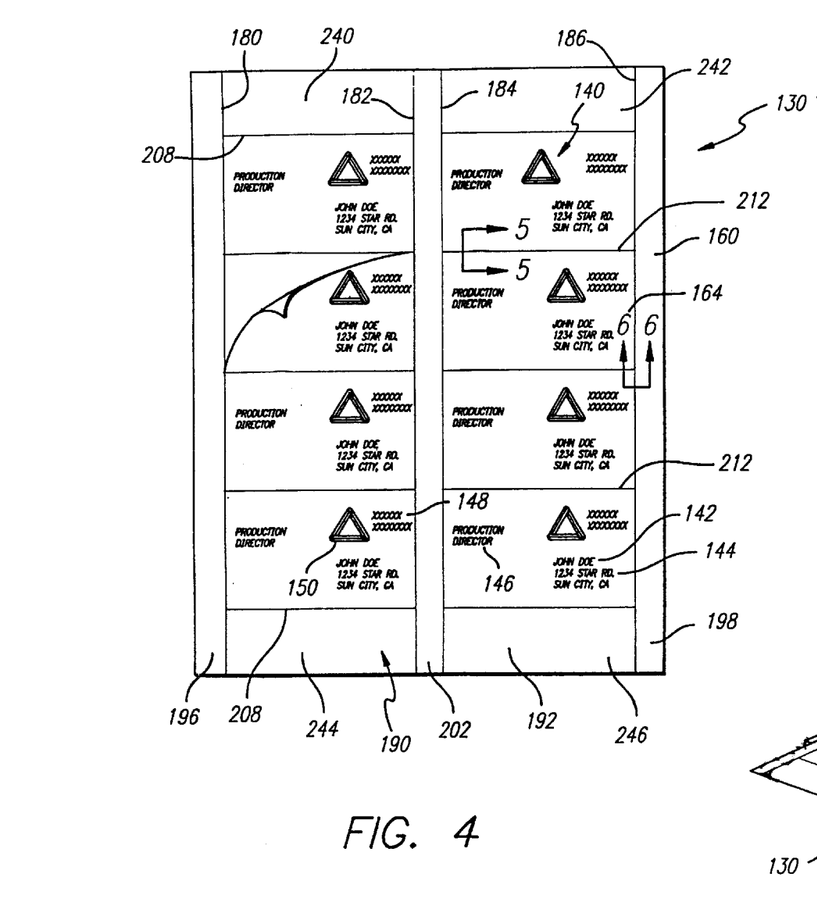
FIG. 4 is a front elevational view of one of the sheet assemblies of the present invention after a printing operation thereon.

The sheet assembly includes a sheet of paper 160 such as the ten mil thick cardstock available from Simpson Paper Mill in Pomona, Calif. The thickness of the sheet of paper 160 is preferably between seven and twenty mils. A pattern of sheet portions or cards 164 are defined on the sheet by a pattern of lines. The sheet portions or cards 164 are preferably rectangular, but other shapes are within the scope of the invention. For example, the sheet 160 can be 8½×11 inches and each of the portions 164 can have the dimensions of a traditional business card (e.g., two by three and a half inches).

At least one of the defining lines is a "substantial-cut" or partial cut line 170, cut along its entire length, substantially but not all of the way through the paper 160; that is, cut from the top surface 174 of the paper approximately ninety percent the way through towards the bottom surface 178. This is shown in the enlarged view in FIG. 6. A preferred embodiment has the substantial-cut line(s) 170 extending 9.3 to 9.5 mil through a ten mil thick cardstock. Alternatively, they can extend between seventy and ninety-eight percent therethrough. The substantial-cut lines 170 can be formed by trimming wheels (rotary knives), by die cutting, laser scoring, or chemical or acid etching.

Figure 5:
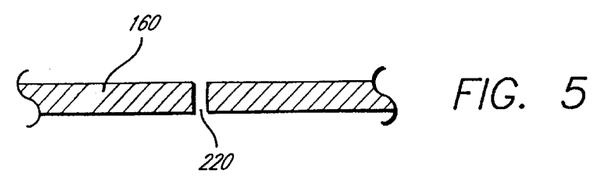
FIG. 5 is an enlarged view taken on line 5—5 of FIG. 4.
Figure 6:
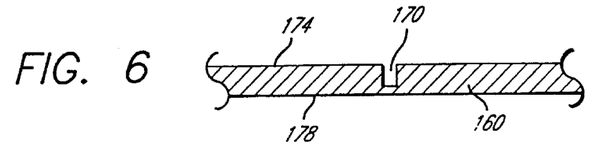
FIG. 6 is an enlarged view taken on line 6—6 of FIG. 4.

A preferred pattern of defining lines is best shown in FIG. 4. It includes four parallel lengthwise lines 180, 182, 184, 186 extending the length of the sheet 160 and defining two parallel columns 190, 192 with waste strips 196, 198 at the outer edges and a center waste strip 202 between the columns. Spaced parallel widthwise lines 208, 212 extend the widths of the columns 190, 192, but not beyond them. As can be understood from FIG. 4, the lengthwise lines 180, 182, 184, 186 define the left and right edges of the sheet portions or cards 164 and the widthwise lines 208, 212 from the top and bottom edges thereof The lengthwise lines 180, 182, 184, 186 are each substantial-cut lines 170 as disclosed above. And the widthwise lines 208, 212 are preferably each through-cut lines formed by die cutting, as best shown in FIG. 5 at 220, extending the entire distance through the sheet 160 along their entire lengths; that is, between and engaging adjacent of the substantial-cut lengthwise lines. The through-cut lines 220 define a perfectly smooth edge and thus are preferred over microperforated or substantial-cut widthwise lines. They also do not require any separating effort. None of the through-cut lines 220 engages any edge of the sheet 160. If they did, the sheet 160 would be likely to be torn along the line. The pattern of substantial-cut and fill-cut lines still provides the card stock sheet 160 with sufficient integrity to reliably pass through the printer 134 without breaking apart.

After the sheet assembly 130 has passed through the printer 134 and the desired indicia 140 printed thereon, the individual cards (or printed media) 164 are separated by tearing or pulling along the four substantial-cut lines. Of course, no further separation is required on the through-cut lines. The side and center waste strips 196, 198, 202 can then be disposed of as can the end margin strips 240, 242, 244, 246 at the ends of both of the columns 190, 192.

From the foregoing detailed description, it will be evident that there are a number of changes, adaptations and modifications of the present invention which come within the province of those skilled in the art. For example, instead of paper the sheets can be laminated sheets, such as plastic and card stock, and instead of rectangular, the cards (or printed or printable media) can be triangular, circular or any other usable shape. However, it is intended that all such variations not departing from the spirit of the invention be considered as within the scope thereof as limited solely by the claims appended hereto.

What is claimed is:

1. A method of producing printed media, comprising the steps of:
   providing a single-sheet construction printable sheet;
   forming a plurality of weakened separation lines on the single-sheet construction printable sheet to divide the single-sheet construction printable sheet into a plurality of connected sheet portions, said forming step including forming at least some of the separation lines as substantial-cut lines in the single-sheet construction printable sheet, the substantial-cut lines extending through a substantial portion of a thickness of the single-sheet construction printable sheet and thereby forming thin uncut intact sheet portions;
   after said forming step, passing the single-sheet construction printable sheet through a printer or copier and thereby printing indicia on the sheet portions; and
   after said printing, separating the sheet portions along the separation lines to form a plurality of individual printed media;
   wherein the thin uncut intact sheet portions collectively comprise the sole means for keeping the sheet portions together during said passing step and thereby maintain the integrity of the single-sheet construction printable sheet until said separating step.

2. The method of claim 1 wherein at least some of the weakened separation lines comprise through-cut lines.

3. The method of claim 1 wherein the substantial-cut lines extend between approximately 70 and 98 percent the way through the single-sheet construction printable sheet.

4. The method of claim 1 wherein the substantial-cut lines extend approximately 90 percent the way through the single-sheet construction printable sheet.

5. The method of claim 1 wherein the substantial-cut lines extend approximately 93 and 95 percent the way through the single-sheet construction printable sheet.

6. The method of claim 1 wherein the individual printed media comprise printed rectangular business cards.

7. The method of claim 1 wherein the substantial-cut lines include first and second substantial-cut lines extending the length or width of the single-sheet construction printable sheet.

8. The method of claim 7 wherein the plurality of separation lines include parallel and spaced weakened separation lines extending perpendicular to and between the first and second substantial-cut lines.

9. The method of claim 8 wherein the weakened separation lines comprise through-cut lines.

10. The method of claim 8 wherein the first and second substantial-cut lines and the weakened separation lines define a column or row of the sheet portions.

11. The method of claim 10 wherein end portions of the column or row define waste paper portions.

12. The method of claim 10 wherein the column or row comprises a column of the sheet portions.

13. The method of claim 10 wherein the column or row defines a first column, the substantial-cut lines further include third and fourth substantial-cut lines parallel to the first and second substantial-cut lines, and the plurality of separation lines further include additional parallel and spaced weakened separation lines extending perpendicular to and between the third and fourth substantial-cut lines.

14. The method of claim 13 wherein the third and fourth substantial-cut lines and the additional weakened separation lines define a second column of the sheet portions parallel to the first column.

15. The method of claim 14 wherein the first and second columns are spaced apart on the single-sheet construction printable sheet so as to define a waste paper strip therebetween.

16. The method of claim 14 wherein the additional weakened separation lines comprise through-cut lines.

17. The method of claim 1 wherein the single-sheet construction printable sheet comprises 10 mil thick cardstock.

18. The method of claim 1 wherein the single-sheet construction printable sheet comprises an approximately 8–12 mil thick media sheet.

19. The method of claim 1 wherein said forming step includes forming the substantial-cut lines in a laser scoring process.

20. The method of claim 1 wherein said forming step includes forming the substantial-cut lines in a trimming wheel, die cutting, chemical etching or acid etching process.

21. The method of claim 1 wherein the printer or copier is an ink jet printer.

22. The method of claim 1 wherein the printer or copier is a laser printer.

23. The method of claim 1 wherein the intact uncut portions engage a face of the single-sheet construction printable sheet.

24. The method of claim 1 wherein the substantial-cut lines are all on only one face of the single-sheet construction printable sheet.

25. A method of producing printed media, comprising the steps of:
   providing a single-sheet construction printable sheet;
   forming a plurality of separation lines on the single-sheet construction printable sheet to divide the single-sheet construction printable sheet into a plurality of connected sheet portions, said forming step including forming at least some of the separation lines as substantial-cut lines in the single-sheet construction printable sheet, the substantial-cut lines extending through a substantial portion of a thickness of the single-sheet construction printable sheet and thereby forming thin uncut intact sheet portions;
   after said forming step, passing the single-sheet construction printable sheet through a printer or copier and thereby printing indicia on the sheet portions; and
   after said printing, separating the sheet portions along the separation lines to form a plurality of individual printed media;
   wherein the thin uncut intact sheet portions collectively comprise the sole means for keeping the sheet portions together during said passing step and thereby maintain the integrity of the single-sheet construction printable sheet until said separating step; and wherein the single-sheet construction printable sheet comprises 10 mil thick cardstock.

26. A method of producing printed media, comprising the steps of:

providing a single-sheet construction printable sheet;

forming a plurality of separation lines on the single-sheet construction printable sheet to divide the single-sheet construction printable sheet into a plurality of connected sheet portions, said forming step including forming at least some of the separation lines as substantial-cut lines in the single-sheet construction printable sheet, the substantial-cut lines extending through a substantial portion of a thickness of the single-sheet construction printable sheet and thereby forming thin uncut intact sheet portions;

after said forming step, passing the single-sheet construction printable sheet through an inkjet printer and thereby printing indicia on the sheet portions; and after said printing, separating the sheet portions along the separation lines to form a plurality of individual printed media;

wherein the thin uncut intact sheet portions collectively comprise the sole means for keeping the sheet portions together during said passing step and thereby maintain the integrity of the single-sheet construction printable sheet until said separating step.

27. A method of producing printed media, comprising the steps of:

providing a single-sheet construction printable sheet;

forming a plurality of separation lines on the single-sheet construction printable sheet to divide the single-sheet construction printable sheet into a plurality of connected sheet portions, said forming step including forming at least some of the separation lines as substantial-cut lines in the single-sheet construction printable sheet, the substantial-cut lines extending through a substantial portion of a thickness of the single-sheet construction printable sheet and thereby forming thin uncut intact sheet portions;

after said forming step, passing the single-sheet construction printable sheet through a laser printer and thereby printing indicia on the sheet portions; and after said printing, separating the sheet portions along the separation lines to form a plurality of individual printed media;

wherein the thin uncut intact sheet portions collectively comprise the sole means for keeping the sheet portions together during said passing step and thereby maintain the integrity of the single-sheet construction printable sheet until said separating step.

28. A method of producing printed media, comprising the steps of:

providing a single-sheet construction printable sheet having a plurality of weakened separation lines formed thereon which divide the single-sheet construction printable sheet into a plurality of connected sheet portions, at least some of the separation lines are substantial-cut lines extending through a substantial portion of a thickness of the single-sheet construction printable sheet and thereby defining thin uncut intact sheet portions;

passing the single-sheet construction printable sheet through a printer or copier and thereby printing indicia on the sheet portions; and after said printing, separating the sheet portions along the separation lines to form a plurality of individual printed media;

wherein the thin uncut intact sheet portions collectively comprise the sole means for keeping the sheet portions together during said passing step and thereby maintain the integrity of the single-sheet construction printable sheet until said separating step.

\* \* \* \* \*

(12) EX PARTE REEXAMINATION CERTIFICATE (6089th)
United States Patent
Popat (10) Number: US 5,997,680 C1
(45) Certificate Issued: Jan. 8, 2008

(54) METHOD OF PRODUCING PRINTED MEDIA (75) Inventor: Ghanshyam H. Popat, Alta Loma, CA (US)

(73) Assignee: Avery Dennison Corporation, Pasadena, CA (US)

Reexamination Request:
No. 90/007,592, Jun. 16, 2005

Reexamination Certificate for:
Patent No.: 5,997,680
Issued: Dec. 7, 1999
Appl. No.: 08/641,332
Filed: Apr. 30, 1996

(51) Int. Cl.
*B32B 37/00* (2006.01)

(52) U.S. Cl. .................. 156/252; 156/250; 156/268; 156/277; 283/105; 428/43; 428/77; 428/78; 428/79; 428/81; 428/138; 428/192; 428/304.4

(58) Field of Classification Search ............ 428/35; 283/105
See application file for complete search history.

(56) References Cited

U.S. PATENT DOCUMENTS

| | | | |
|---|---|---|---|
| 3,790,744 A | * | 2/1974 | Bowen .................. 219/121.69 |
| 4,005,810 A | | 2/1977 | Porter |
| 4,048,736 A | | 9/1977 | Castleman et al. |
| 4,264,662 A | | 4/1981 | Taylor et al. |
| 4,380,564 A | | 4/1983 | Cancio et al. |
| 4,428,857 A | | 1/1984 | Taylor et al. |
| 4,465,729 A | | 8/1984 | Cancio et al. |
| 4,732,069 A | | 3/1988 | Wood et al. |
| 4,833,122 A | | 5/1989 | Doll et al. |
| 4,863,772 A | | 9/1989 | Cross |
| 5,001,106 A | | 3/1991 | Egashira et al. |
| 5,031,939 A | | 7/1991 | Webendorfer et al. |
| 5,178,419 A | | 1/1993 | Bolnick et al. |
| 5,198,275 A | | 3/1993 | Klein |
| 5,318,325 A | | 6/1994 | Ipsen |
| 5,389,414 A | | 2/1995 | Popat |
| 5,398,580 A | * | 3/1995 | Gerhardt et al. .............. 83/880 |
| 5,413,532 A | | 5/1995 | Raby |
| 5,487,568 A | | 1/1996 | Ipsen |
| 5,560,966 A | | 10/1996 | Kishimoto et al. |
| 5,571,587 A | | 11/1996 | Bishop et al. |
| 5,702,789 A | | 12/1997 | Fernandez-Kirchberger et al. |
| 5,709,913 A | | 1/1998 | Andersen et al. |
| 5,853,837 A | | 12/1998 | Popat |
| 5,914,165 A | | 6/1999 | Freedman |
| 5,947,368 A | | 9/1999 | Thresher et al. |
| 5,993,928 A | | 11/1999 | Popat |
| 5,997,683 A | | 12/1999 | Popat |
| 6,173,649 B1 | | 1/2001 | Onishi |

* cited by examiner

*Primary Examiner*—Jimmy G. Foster (57) ABSTRACT

Two pairs of parallel substantial-cut or scored lines extend the length of a card stock sheet and short through-cut lines extend between each of the pairs to define two columns of business card blanks on the sheet. The sheet is passed through a laser or ink jet printer, printing the desired identifying or other indicia on the blanks. The blanks are then separated along the substantial-cut and through-cut lines and the waste sheet portions at the ends, sides, and between the columns are disposed of. The business cards separate cleanly along the substantial-cut lines, superior to the microperforated business card separation lines. Even with the substantial-cut and full-cut lines, the card stock sheets have enough integrity to reliably pass through the printer without breaking apart.

US 5,997,680 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–28 are cancelled.

New claims 29–137 are added and determined to be patentable.

29. *A method of producing printed media, comprising the steps of:*
   *providing a single-sheet construction printable sheet having an exposed back surface;*
   *forming a plurality of weakened separation lines on the single-sheet construction printable sheet to divide the single-sheet construction printable sheet into a plurality of connected sheet portions, said forming step including forming at least some of the weakened separation lines as substantial-cut lines in the single-sheet construction printable sheet, the substantial-cut lines extending through a substantial portion of a thickness of the single-sheet construction printable sheet and thereby forming thin uncut intact sheet portions which include a portion of the exposed back surface;*
   *wherein the substantial-cut lines are mechanically die-cut substantial-cut lines;*
   *wherein one of the thin uncut intact sheet portions extends continuously in an unbroken manner along an entire edge of one of the connected sheet portions;*
   *wherein the substantial portion is 70–98% of the thickness;*
   *after said forming step, passing the single-sheet construction printable sheet through a printer or copier and thereby printing indicia on the connected sheet portions; and*
   *after said printing, separating the connected sheet portions along the weakened separation lines and along and entirely through the thin uncut intact sheet portions and through the exposed back surface to form a plurality of individual printed media;*
   *wherein entire back surfaces of each of the printed media are formed by the exposed back surface of the single-sheet construction printable sheet; and*
   *wherein the thin uncut intact sheet portions collectively comprise the sole means for keeping the connected sheet portions together during said passing step and thereby maintain the integrity of the single-sheet construction printable sheet until said separating step.*

30. *The method of claim 29 wherein the substantial-cut lines extend between approximately 80 and 98 percent the way through the single-sheet construction printable sheet.*

31. *The method of claim 29 wherein the single-sheet construction printable sheet comprises a 10–20 mil thick sheet.*

32. *The method of claim 29 wherein said separating includes tearing at least some of the thin uncut intact sheet portions.*

33. *The method of claim 29 wherein said separating includes pulling along the substantial-cut lines.*

34. *The method of claim 29 wherein at least one of the weakened separation lines comprises a through-cut line.*

35. *The method of claim 29 wherein the substantial-cut lines extend between approximately 80 and 98 percent the way through the single-sheet construction printable sheet and the single-sheet construction printable sheet is 10–20 mils thick.*

36. *The method of claim 29 wherein the single-sheet construction printable sheet comprises an 8–12 mil thick sheet.*

37. *The method of claim 29 wherein the connected sheet portions define a column or row of connected sheet portions.*

38. *The method of claim 37 wherein the substantial-cut lines include first and second substantial-cut lines, the column or row defines a first column, the substantial-cut lines further include third and fourth substantial-cut lines parallel to the first and second substantial-cut lines, and the plurality of weakened separation lines further include additional parallel and spaced weakened separation lines extending perpendicular to and between the third and fourth substantial-cut lines and defining a second column.*

39. *The method of claim 38 wherein the additional parallel and spaced weakened separation lines comprise through-cut lines.*

40. *The method of claim 37 wherein portions of the single-sheet construction printable sheet at the ends of the column or row define waste portions.*

41. *The method of claim 29 wherein the printer or copier is an ink jet printer.*

42. *The method of claim 29 wherein the printer or copier is a laser printer.*

43. *The method of claim 29 wherein all of the thin uncut intact sheet portions engage a same face of the single-sheet construction printable sheet.*

44. *The method of claim 29 wherein all of the individual printed media are free of cut lines on front faces thereof.*

45. *The method of claim 29 wherein the substantial-cut lines extend between approximately 93 and 95 percent the way through the single-sheet construction printable sheet.*

46. *The method of claim 29 wherein the individual printed media comprise printed rectangular business cards.*

47. *The method of claim 29 wherein the substantial-cut lines include a substantial-cut line which extends continuously the length or width of the single-sheet construction printable sheet.*

48. *The method of claim 29 wherein the connected sheet portions are centrally disposed on the single-sheet construction printable sheet and are surrounded by a waste frame.*

49. *The method of claim 29 wherein all of the substantial-cut lines are on only one face of the single-sheet construction printable sheet.*

50. *The method of claim 29 wherein the single-sheet construction printable sheet is a single-layer printable sheet.*

51. *The method of claim 29 wherein the connected sheet portions are arranged in two spaced columns defining a waste strip therebetween.*

52. *The method of claim 29 wherein the single-sheet construction printable sheet has no weakened lines on an opposite side thereof coinciding with the substantial-cut lines.*

53. *The method of claim 29 wherein another one of the thin uncut intact sheet portions extends continuously in an*

*unbroken manner along another entire edge of the one of the connected sheet portions.*

*54. A method of producing printed media, comprising the steps of:*

*providing a single-sheet construction printable sheet having an exposed back surface;*

*forming a plurality of weakened separation lines on the single-sheet construction printable sheet to divide the single-sheet construction printable sheet into a plurality of connected sheet portions, said forming step including forming at least some of the weakened separation lines as substantial-cut lines in the single-sheet construction printable sheet, the substantial-cut lines extending through a substantial portion of a thickness of the single-sheet construction printable sheet and thereby forming thin uncut intact sheet portions which include a portion of the exposed back surface;*

*wherein the substantial-cut lines are mechanically die-cut substantial-cut lines;*

*wherein the substantial portion is 70–98% of the thickness;*

*after said forming step, passing the single-sheet construction printable sheet through a printer or copier and thereby printing indicia on the connected sheet portions; and*

*after said printing, separating the connected sheet portions along the weakened separation lines and along and entirely through the thin uncut intact sheet portions and through the exposed back surface to form a plurality of individual printed media;*

*wherein entire back surfaces of each of the printed media are formed by the exposed back surface of the single-sheet construction printable sheet;*

*wherein the thin uncut intact sheet portions collectively comprise the sole means for keeping the connected sheet portions together during said passing step and thereby maintain the integrity of the single-sheet construction printable sheet until said separating step; and*

*wherein the single-sheet construction printable sheet has no perforation lines coinciding with the substantial-cut lines.*

*55. The method of claim 54 wherein the substantial-cut lines extend between approximately 80 and 98 percent the way through the single-sheet construction printable sheet.*

*56. The method of claim 54 wherein the single-sheet construction printable sheet comprises a 10–20 mil thick sheet.*

*57. The method of claim 54 wherein said separating includes tearing at least some of the thin uncut intact sheet portions.*

*58. The method of claim 54 wherein said separating includes pulling along the substantial-cut lines.*

*59. The method of claim 54 wherein at least one of the weakened separation lines comprises a through-cut line.*

*60. The method of claim 54 wherein the substantial-cut lines extend between approximately 80 and 98 percent the way through the single-sheet construction printable sheet and the single-sheet construction printable sheet is 10–20 mils thick.*

*61. The method of claim 54 wherein the single-sheet construction printable sheet comprises an 8–12 mil thick sheet.*

*62. The method of claim 54 wherein the connected sheet portions define a column or row of connected sheet portions.*

*63. The method of claim 62 wherein the substantial-cut lines include first and second substantial-cut lines, the column or row defines a first column, the substantial-cut lines further include third and fourth substantial-cut lines parallel to the first and second substantial-cut lines, and the plurality of weakened separation lines further include additional parallel and spaced weakened separation lines extending perpendicular to and between the third and fourth substantial-cut lines and defining a second column.*

*64. The method of claim 63 wherein the additional parallel and spaced weakened separation lines comprise through-cut lines.*

*65. The method of claim 62 wherein portions of the single-sheet construction printable sheet at the ends of the column or row define waste portions.*

*66. The method of claim 54 wherein the printer or copier is an ink jet printer.*

*67. The method of claim 54 wherein the printer or copier is a laser printer.*

*68. The method of claim 54 wherein all of the thin uncut intact sheet portions engage a same face of the single-sheet construction printable sheet.*

*69. The method of claim 54 wherein all of the individual printed media are free of cut lines on front faces thereof.*

*70. The method of claim 54 wherein the substantial-cut lines extend between approximately 93 and 95 percent the way through the single-sheet construction printable sheet.*

*71. The method of claim 54 wherein the individual printed media comprise printed rectangular business cards.*

*72. The method of claim 54 wherein the substantial-cut lines include a substantial-cut line which extends continuously the length or width of the single-sheet construction printable sheet.*

*73. The method of claim 54 wherein the connected sheet portions are centrally disposed on the single-sheet construction printable sheet and surrounded by a waste frame.*

*74. The method of claim 54 wherein all of the substantial-cut lines are on only one face of the single-sheet construction printable sheet.*

*75. The method of claim 54 wherein the single-sheet construction printable sheet is a single-layer printable sheet.*

*76. The method of claim 54 wherein the connected sheet portions are arranged in two spaced columns defining a waste strip therebetween.*

*77. The method of claim 54 wherein one of the thin uncut intact sheet portions extends continuously in an unbroken manner across an entire width or length of the single-sheet construction printable sheet.*

*78. The method of claim 54 wherein another one of the thin uncut intact sheet portions extends continuously in an unbroken manner along another entire edge of the one of the connected sheet portions.*

*79. A method of producing printed media, comprising the steps of:*

*providing a single-sheet construction printable sheet having a plurality of weakened separation lines formed thereon which divide the single-sheet construction printable sheet into a plurality of connected sheet portions, at least some of the weakened separation lines are substantial-cut lines extending through a substantial portion of a thickness of the single-sheet construction printable sheet and thereby defining thin uncut intact sheet portions;*

*wherein the single-sheet construction printable sheet has an exposed back surface;*

*wherein the substantial-cut lines are mechanically die-cut substantial-cut lines;*

*wherein each of the thin uncut intact sheet portions includes a portion of the exposed back surface;* wherein the substantial portion is 70–98% of the thickness;

passing the single-sheet construction printable sheet through a printer or copier and thereby printing indicia on the connected sheet portions; and after said printing, separating the connected sheet portions along the weakened separation lines and along and entirely through the thin uncut intact sheet portions and through the exposed back surface to form a plurality of individual printed media;

wherein entire back surfaces of each of the printed media are formed by the exposed back surface of the single-sheet construction printable sheet;

wherein the thin uncut intact sheet portions collectively comprise the sole means for keeping the connected sheet portions together during said passing step and thereby maintain the integrity of the single-sheet construction printable sheet until said separating step; and wherein the single-sheet construction printable sheet has no perforation lines coinciding with the substantial-cut lines.

80. The method of claim 79 wherein the substantial-cut lines extend between approximately 80 and 98 percent the way through the single-sheet construction printable sheet.

81. The method of claim 79 wherein the single-sheet construction printable sheet comprises a 10–20 mil thick sheet.

82. The method of claim 79 wherein said separating includes tearing at least some of the thin uncut intact sheet portions.

83. The method of claim 79 wherein said separating includes pulling along the substantial-cut lines.

84. The method of claim 79 wherein at least one of the weakened separation lines comprises a through-cut line.

85. The method of claim 79 wherein the substantial-cut lines extend between approximately 80 and 98 percent the way through the single-sheet construction printable sheet and the single-sheet construction printable sheet is 10–20 mils thick.

86. The method of claim 79 wherein the single-sheet construction printable sheet comprises an 8–12 mil thick sheet.

87. The method of claim 79 wherein the connected sheet portions define a column or row of connected sheet portions.

88. The method of claim 87 wherein the substantial-cut lines include first and second substantial-cut lines, the column or row defines a first column, the substantial-cut lines further include third and fourth substantial-cut lines parallel to the first and second substantial-cut lines, and the plurality of weakened separation lines further include additional parallel and spaced weakened separation lines extending perpendicular to and between the third and fourth substantial-cut lines and defining a second column.

89. The method of claim 88 wherein the additional parallel and spaced weakened separation lines comprise through-cut lines.

90. The method of claim 87 wherein portions of the single-sheet construction printable sheet at the ends of the column or row define waste portions.

91. The method of claim 79 wherein the printer or copier is an ink jet printer.

92. The method of claim 79 wherein the printer or copier is a laser printer.

93. The method of claim 79 wherein all of the thin uncut intact sheet portions engage a same face of the single-sheet construction printable sheet.

94. The method of claim 79 wherein all of the individual printed media are free of cut lines on front faces thereof.

95. The method of claim 79 wherein the substantial-cut lines extend between approximately 93 and 95 percent the way through the single-sheet construction printable sheet.

96. The method of claim 79 wherein the individual printed media comprise printed rectangular business cards.

97. The method of claim 79 wherein the substantial-cut lines include a substantial-cut line which extends continuously the length or width of the single-sheet construction printable sheet.

98. The method of claim 79 wherein the connected sheet portions are centrally disposed on the single-sheet construction printable sheet and surrounded by a waste frame.

99. The method of claim 79 wherein all of the substantial-cut lines are on only one face of the single-sheet construction printable sheet.

100. The method of claim 79 wherein the single-sheet construction printable sheet is a single-layer printable sheet.

101. The method of claim 79 wherein the connected sheet portions are arranged in two spaced columns defining a waste strip therebetween.

102. The method of claim 79 wherein one of the thin uncut intact sheet portions extends continuously in an unbroken manner across an entire width or length of the single-sheet construction printable sheet.

103. A method of producing printed media, comprising the steps of:

providing a single-sheet construction printable sheet having a plurality of weakened separation lines formed thereon which divide the single-sheet construction printable sheet into a plurality of connected sheet portions, at least some of the weakened separation lines are substantial-cut lines extending through a substantial portion of a thickness of the single-sheet construction printable sheet and thereby defining thin uncut intact sheet portions;

wherein the single-sheet construction printable sheet has an exposed back surface;

wherein the substantial-cut lines are mechanically die-cut substantial-cut lines;

wherein one of the thin uncut intact sheet portions extends continuously in an unbroken manner along an entire edge of one of the connected sheet portions;

wherein each of the thin uncut intact sheet portions includes a portion of the exposed back surface;

wherein the substantial portion is 70–98% of the thickness;

passing the single-sheet construction printable sheet through a printer or copier and thereby printing indicia on the connected sheet portions; and after said printing, separating the connected sheet portions along the weakened separation lines and along and entirely through the thin uncut intact sheet portions and through the exposed back surface to form a plurality of individual printed media;

wherein entire back surfaces of each of the printed media are formed by the exposed back surface of the single-sheet construction printable sheet; and wherein the thin uncut intact sheet portions collectively comprise the sole means for keeping the connected sheet portions together during said passing step and thereby maintain the integrity of the single-sheet construction printable sheet until said separating step.

104. The method of claim 103 wherein the substantial-cut lines extend between approximately 80 and 98 percent the way through the single-sheet construction printable sheet.

105. The method of claim 103 wherein the single-sheet construction printable sheet comprises a 10–20 mil thick sheet.

106. The method of claim 103 wherein said separating includes tearing at least some of the thin uncut intact sheet portions.

107. The method of claim 103 wherein said separating includes pulling along the substantial-cut lines.

108. The method of claim 103 wherein at least one of the weakened separation lines comprises a through-cut line.

109. The method of claim 103 wherein the substantial-cut lines extend between approximately 80 and 98 percent the way through the single-sheet construction printable sheet and the single-sheet construction printable sheet is 10–20 mils thick.

110. The method of claim 103 wherein the single-sheet construction printable sheet comprises an 8–12 mil thick sheet.

111. The method of claim 103 wherein the connected sheet portions define a column or row of connected sheet portions.

112. The method of claim 111 wherein the substantial-cut lines include first and second substantial-cut lines, the column or row defines a first column, the substantial-cut lines further include third and fourth substantial-cut lines parallel to the first and second substantial-cut lines, and the plurality of weakened separation lines further include additional parallel and spaced weakened separation lines extending perpendicular to and between the third and fourth substantial-cut lines and defining a second column.

113. The method of claim 112 wherein the additional parallel and spaced weakened separation lines comprise through-cut lines.

114. The method of claim 111 wherein portions of the single-sheet construction printable sheet at the ends of the column or row define waste portions.

115. The method of claim 103 wherein the printer or copier is an ink jet printer.

116. The method of claim 103 wherein the printer or copier is a laser printer.

117. The method of claim 103 wherein all of the thin uncut intact sheet portions engage a same face of the single-sheet construction printable sheet.

118. The method of claim 103 wherein all of the individual printed media are free of cut lines on front faces thereof.

119. The method of claim 103 wherein the substantial-cut lines extend between approximately 93 and 95 percent the way through the single-sheet construction printable sheet.

120. The method of claim 103 wherein the individual printed media comprise printed rectangular business cards.

121. The method of claim 103 wherein the substantial-cut lines include a substantial-cut line which extends continuously the length or width of the single-sheet construction printable sheet.

122. The method of claim 103 wherein the connected sheet portions are centrally disposed on the single-sheet construction printable sheet and surrounded by a waste frame.

123. The method of claim 103 wherein all of the substantial-cut lines are on only one face of the single-sheet construction printable sheet.

124. The method of claim 103 wherein the single-sheet construction printable sheet is a single-layer printable sheet.

125. The method of claim 103 wherein the connected sheet portions are arranged in two spaced columns defining a waste strip therebetween.

126. The method of claim 103 wherein the single-sheet construction printable sheet has no weakened lines on an opposite side thereof coinciding with the substantial-cut lines.

127. The method of claim 103 wherein another one of the thin uncut intact sheet portions extends continuously in an unbroken manner across an entire another edge of the one of the connected sheet portions.

128. A method of producing printed media, comprising the steps of:

providing a single-sheet construction printable sheet;

forming a plurality of weakened separation lines on the single-sheet construction printable sheet to divide the single-sheet construction printable sheet into a plurality of connected sheet portions, said forming step including forming at least some of the separation lines as substantial-cut lines in the single-sheet construction printable sheet, the substantial-cut lines extending through a substantial portion of a thickness of the single-sheet construction printable sheet and thereby forming thin uncut intact sheet portions;

after said forming step, passing the single-sheet construction printable sheet through a printer or copier and thereby printing indicia on the connected sheet portions; and after said printing, separating the connected sheet portions along the separation lines to form a plurality of individual printed media;

wherein the thin uncut intact sheet portions collectively comprise the sole means for keeping the connected sheet portions together during said passing step and thereby maintain the integrity of the single-sheet construction printable sheet until said separating step;

wherein one of the thin cut intact sheet portions extends continuously in an unbroken manner along an entire edge of one of the connected sheet portions; and wherein the single-sheet construction printable sheet is a single-layer printable sheet.

129. A method of producing printed media, comprising the steps of:

providing a single-sheet construction printable sheet;

forming a plurality of separation lines on the single-sheet construction printable sheet to divide the single-sheet construction printable sheet into a plurality of connected sheet portions, said forming step including forming at least some of the separation lines as substantial-cut lines in the single-sheet construction printable sheet, the substantial-cut lines extending through a substantial portion of a thickness of the single-sheet construction printable sheet and thereby forming thin uncut intact sheet portions;

after said forming step, passing the single-sheet construction printable sheet through a printer or copier and thereby printing indicia on the connected sheet portions; and after said printing, separating the connected sheet portions along the separation lines to form a plurality of individual printed media;

wherein the thin uncut intact sheet portions collectively comprise the sole means for keeping the connected sheet portions together during said passing step and thereby maintain the integrity of the single-sheet construction printable sheet until said separating step;

wherein the single-sheet construction printable sheet comprises 10 mil thick cardstock;

wherein one of the thin uncut intact sheet portions extends continuously in an unbroken manner along an entire edge of one of the connected sheet portions; and wherein the single-sheet construction printable sheet is a single-layer printable sheet.

130. A method of producing printed media, comprising the steps of:

providing a single-sheet construction printable sheet;

forming a plurality of separation lines on the single-sheet construction printable sheet to divide the single-sheet construction printable sheet into a plurality of connected sheet portions, said forming step including forming at least some of the separation lines as substantial-cut lines in the single-sheet construction printable sheet, the substantial-cut lines extending through a substantial portion of a thickness of the single-sheet construction printable sheet and thereby forming thin uncut intact sheet portions;

after said forming step, passing the single-sheet construction printable sheet through an inkjet printer and thereby printing indicia on the connected sheet portions; and after said printing, separating the connected sheet portions along the separation lines to form a plurality of individual printed media;

wherein the thin uncut intact sheet portions collectively comprise the sole means for keeping the connected sheet portions together during said passing step and thereby maintain the integrity of the single-sheet construction printable sheet until said separating step;

wherein one of the thin uncut intact sheet portions extends continuously in an unbroken manner along an entire edge of one of the connected sheet portions; and wherein the single-sheet construction printable sheet is a single-layer printable sheet.

131. A method of producing printed media, comprising the steps of:

providing a single-sheet construction printable sheet;

forming a plurality of separation lines on the single-sheet construction printable sheet to divide the single-sheet construction printable sheet into a plurality of connected sheet portions, said forming step including forming at least some of the separation lines as substantial-cut lines in the single-sheet construction printable sheet, the substantial-cut lines extending through a substantial portion of a thickness of the single-sheet construction printable sheet and thereby forming thin uncut intact sheet portions;

after said forming step, passing the single-sheet construction printable sheet through a laser printer and thereby printing indicia on the connected sheet portions; and after said printing, separating the connected sheet portions along the separation lines to form a plurality of individual printed media;

wherein the thin uncut intact sheet portions collectively comprise the sole means for keeping the connected sheet portions together during said passing step and thereby maintain the integrity of the single-sheet construction printable sheet until said separating step;

wherein one of the thin uncut intact sheet portions extends continuously in an unbroken manner along an entire edge of one of the connected sheet portions; and wherein the single-sheet construction printable sheet is a single-layer printable sheet.

132. A method of producing printed media, comprising the steps of:

providing a single-sheet construction printable sheet having a plurality of weakened separation lines formed thereon which divide the single-sheet construction printable sheet into a plurality of connected sheet portions, at least some of the separation lines are substantial-cut lines extending through a substantial portion of a thickness of the single-sheet construction printable sheet and thereby defining thin uncut intact sheet portions;

passing the single-sheet construction printable sheet through a printer or copier and thereby printing indicia on the connected sheet portions; and after said printing, separating the connected sheet portions along the separation lines to form a plurality of individual printed media;

wherein the thin uncut intact sheet portions collectively comprise the sole means for keeping the connected sheet portions together during said passing step and thereby maintain the integrity of the single-sheet construction printable sheet until said separating step;

wherein one of the thin uncut intact sheet portions extends continuously in an unbroken manner along an entire edge of one of the connected sheet portions; and wherein the single-sheet construction printable sheet is a single-layer printable sheet.

133. A method of producing printed media, comprising the steps of:

providing a single-sheet construction printable sheet;

forming a plurality of weakened separation lines on the single-sheet construction printable sheet to divide the single-sheet construction printable sheet into a plurality of connected sheet portions, said forming step including forming at least some of the separation lines as substantial-cut lines in the single-sheet construction printable sheet, the substantial-cut lines extending through a substantial portion of a thickness of the single-sheet construction printable sheet and thereby forming thin uncut intact sheet portions;

after said forming step, passing the single-sheet construction printable sheet through a printer or copier and thereby printing indicia on the connected sheet portions; and after said printing, separating the connected sheet portions along the separation lines to form a plurality of individual printed media;

wherein the thin uncut intact sheet portions collectively comprise the sole means for keeping the connected sheet portions together during said passing step and thereby maintain the integrity of the single-sheet construction printable sheet until said separating step;

wherein the single-sheet construction printable sheet has no perforation lines on an opposite side thereof coinciding with the substantial-cut lines; and wherein the single-sheet construction printable sheet is a single-layer printable sheet.

134. A method of producing printed media, comprising the steps of:

providing a single-sheet construction printable sheet;

forming a plurality of separation lines on the single-sheet construction printable sheet to divide the single-sheet construction printable sheet into a plurality of connected sheet portions, said forming step including forming at least some of the separation lines as substantial-cut lines in the single-sheet construction printable sheet, the substantial-cut lines extending through a substantial portion of a thickness of the single-sheet construction printable sheet and thereby forming thin uncut intact sheet portions;

after said forming step, passing the single-sheet construction printable sheet through a printer or copier and thereby printing indicia on the connected sheet portions; and after said printing, separating the connected sheet portions along the separation lines to form a plurality of individual printed media;

wherein the thin uncut intact sheet portions collectively comprise the sole means for keeping the connected sheet portions together during said passing step and thereby maintain the integrity of the single-sheet construction printable sheet until said separating step;

wherein the single-sheet construction printable sheet comprises 10 mil thick cardstock;

wherein the single-sheet construction printable sheet has no perforation lines on an opposite side thereof coinciding with the substantial-cut lines; and wherein the single-sheet construction printable sheet is a single-layer printable sheet.

135. A method of producing printed media, comprising the steps of:

providing a single-sheet construction printable sheet;

forming a plurality of separation lines on the single-sheet construction printable sheet to divide the single-sheet construction printable sheet into a plurality of connected sheet portions, said forming step including forming at least some of the separation lines as substantial-cut lines in the single-sheet construction printable sheet, the substantial-cut lines extending through a substantial portion of a thickness of the single-sheet construction printable sheet and thereby forming thin uncut intact sheet portions;

after said forming step, passing the single-sheet construction printable sheet through an inkjet printer and thereby printing indicia on the connected sheet portions; and after said printing, separating the connected sheet portions along the separation lines to form a plurality of individual printed media;

wherein the thin uncut intact sheet portions collectively comprise the sole means for keeping the connected sheet portions together during said passing step and thereby maintain the integrity of the single-sheet construction printable sheet until said separating step;

wherein the single-sheet construction printable sheet has no perforation lines on an opposite side thereof coinciding with the substantial-cut lines; and wherein the single-sheet construction printable sheet is a single-layer printable sheet.

136. A method of producing printed media, comprising the steps of:

providing a single-sheet construction printable sheet;

forming a plurality of separation lines on the single-sheet construction printable sheet to divide the single-sheet construction printable sheet into a plurality of connected sheet portions, said forming step including forming at least some of the separation lines as substantial-cut lines in the single-sheet construction printable sheet, the substantial-cut lines extending through a substantial portion of a thickness of the single-sheet construction printable sheet and thereby forming thin uncut intact sheet portions;

after said forming step, passing the single-sheet construction printable sheet through a laser printer and thereby printing indicia on the connected sheet portions; and after said printing, separating the connected sheet portions along the separation lines to form a plurality of individual printed media;

wherein the thin uncut intact sheet portions collectively comprise the sole means for keeping the connected sheet portions together during said passing step and thereby maintain the integrity of the single-sheet construction printable sheet until said separating step;

wherein the single-sheet construction printable sheet has no perforation lines on an opposite side thereof coinciding with the substantial-cut lines; and wherein the single-sheet construction printable sheet is a single-layer printable sheet.

137. A method of producing printed media, comprising the steps of:

providing a single-sheet construction printable sheet having a plurality of weakened separation lines formed thereon which divide the single-sheet construction printable sheet into a plurality of connected sheet portions, at least some of the separation lines are substantial-cut lines extending through a substantial portion of a thickness of the single-sheet construction printable sheet and thereby defining thin uncut intact sheet portions;

passing the single-sheet construction printable sheet through a printer or copier and thereby printing indicia on the connected sheet portions; and after said printing, separating the connected sheet portions along the separation lines to form a plurality of individual printed media;

wherein the thin uncut intact sheet portions collectively comprise the sole means for keeping the connected sheet portions together during said passing step and thereby maintain the integrity of the single-sheet construction printable sheet until said separating step;

wherein the single-sheet construction printable sheet has no perforation lines on an opposite side thereof coinciding with the substantial-cut lines; and wherein the single-sheet construction printable sheet is a single-layer printable sheet.

* * * * *